United States Patent [19]

Hironaka

[11] 3,940,982

[45] Mar. 2, 1976

[54] SUBBOTTOM ROCK MAPPING PROBE

[75] Inventor: Melvin C. Hironaka, Camarillo, Calif.

[73] Assignee: The United States of America as represented by the Secretary of the Navy, Washington, D.C.

[22] Filed: Sept. 16, 1974

[21] Appl. No.: 506,372

[52] U.S. Cl. ............................................ 73/170 A
[51] Int. Cl.² ........................................ G01W 1/00
[58] Field of Search ........................... 73/170 A, 84

[56] References Cited
UNITED STATES PATENTS 3,534,605   10/1970   De Koning et al. ............... 73/170 A
3,774,718   11/1973   Igarashi et al. .................... 73/170 A

FOREIGN PATENTS OR APPLICATIONS 1,176,595   1/1970   United Kingdom .................... 73/84

Primary Examiner—Richard C. Queisser
Assistant Examiner—Anthony V. Ciarlante
Attorney, Agent, or Firm—Richard S. Sciascia; Joseph M. St.Amand; Darrell E. Hollis

[57] ABSTRACT

A subbottom rock mapping probe for measuring the thickness of a sediment layer located on the bottom of a body of water comprising an automatic, downwardly extending, telescoping probe that is gimbally connected to a support member. Water is forced through the probe to disperse the sediment impeding the probe's downward extension. Recording equipment and related measuring devices measure and record the depth of penetration of the probe into the sediment layer from an initial or reference position.

8 Claims, 3 Drawing Figures

SUBBOTTOM ROCK MAPPING PROBE

BACKGROUND OF THE INVENTION

1. Field of the Invention

The present invention relates generally to underwater mapping apparatus and method and more particularly to a subbottom rock mapping probe for measuring the thickness of a sediment layer located on the bottom of a body of water.

2. Description of the Prior Art

Presently, in deeper waters sonic subbottom profiling methods are utilized to obtain an indication of the location of the bedrock surface. In an attempt to verify and correlate the information collected by these methods, core samplings are made. However, core sampling operations experience limitations in penetration and sample losses which result all too often in inadequate or inaccurate information. In addition, the resolution of data collected from sonic subbottom profiling methods is such that an accurate value for the depth to the bedrock is not obtainable.

In shallower waters, such as the surf zone, the effect of the entrained air in the water on the accuracy of the data obtained from sonic subbottom profiling methods is not known. Also, the presence of sand in this region makes it difficult for sonic signals to penetrate to the seafloor and provide accurate data on the rock surface. In addition, sonic equipment is difficult to use in this zone.

SUMMARY OF THE INVENTION

The general purpose of this invention is to provide a subbottom rock mapping probe that provides easier operation and greater accuracy of measurement than prior art subbottom rock mapping devices. To attain this, the present invention provides an automatic, downwardly extending, telescoping probe that is gimbally connected to a support member. Water is forced through the probe to disperse the sediment impeding the probe's downward entension. The probe is lowered to the surface of a sediment layer by a line from the water surface. Upon striking the sediment layer surface, a switch on the support member is thrown, thereby actuating the telescoping probe and water-forcing mechanism. The force of gravity causes the probe to extend downward. Recording equipment and related measuring devices measure and record the depth of penetration of the probe into the sedmiment layer from an initial or reference position.

OBJECTS OF THE INVENTION

Accordingly, one object of the present invention is to provide greater accuracy of measurement data.

Another object is to provide simpler operation.

Another object is to provide operation at greater water depths.

Another object is to eliminate the undesirable qualities and attendant errors present in sonic subbottom profiling methods.

Other objects and a more complete appreciation of the present invention and its many attendant advantages will develop as the same becomes better understood by reference to the following detailed description when considered in connection with the accompanying drawings in which like reference numerals designate like parts throughout the figures thereof and wherein.

DESCRIPTION OF THE PREFERRED EMBODIMENT

Figure 1:
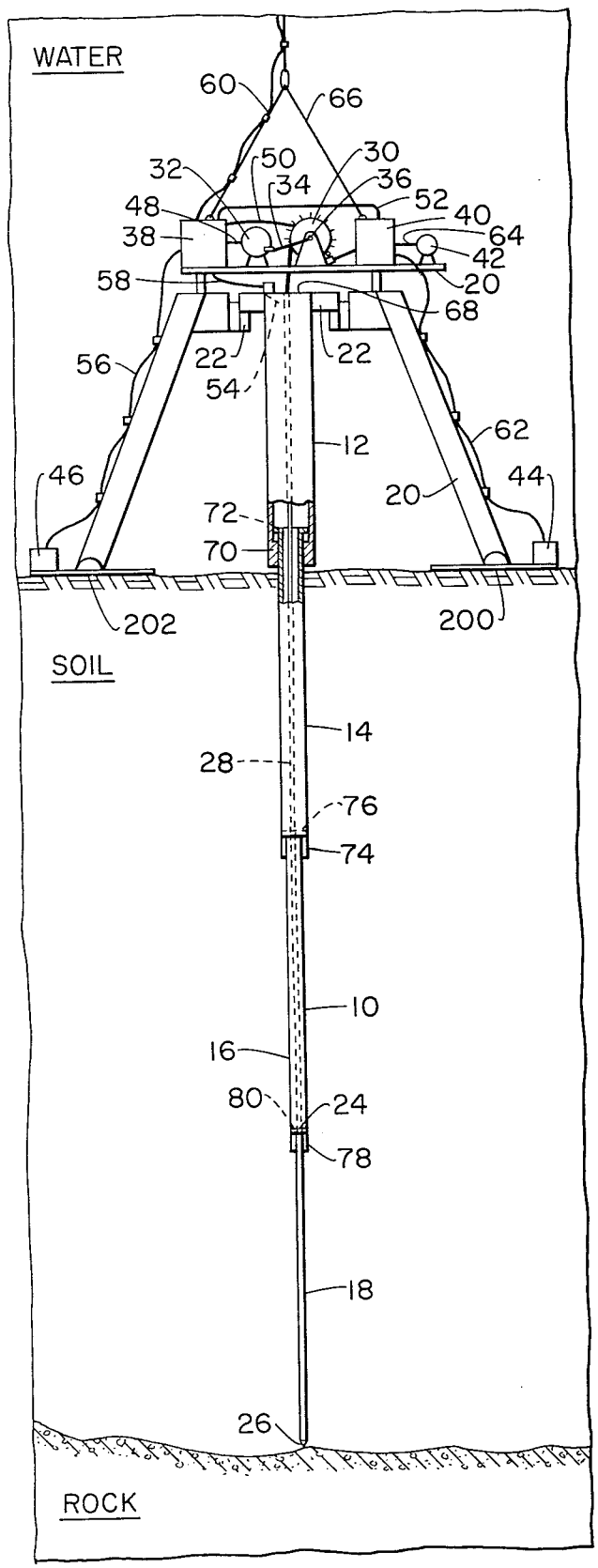
FIG. 1 is a front view of a specific embodiment of the present invention.

Turning to FIG. 1, probe 10 comprises a series of telescoping sections 12, 14, 16 and 18. Of course, while in FIG. 1 only four telescoping sections are illustrated, additional telescoping sections may be utilized. Probe 10 is gimbally connected to support member 20 by gimbal mechanism 22. Gimbal mechanism 22 allows probe 10 to maintain a vertical position. Tube 12 is the outermost telescoping section.

The smallest or innermost telescoping section 18 has a hose connection 24 on one end and a nozzle 26 on the other end. A hose 28 connects to hose connection 24 and extends upwards through telescoping sections 12, 14 and 16. Hose 28 winds up on winch 30. Water enters hose 28 from pump 32 via water pipe 34 and water swivel joint 36. The water from pump 32 is forced out nozzle 26 to disperse the bottom sediment impeding the downward movement of probe 10.

Also attached to support member 20 are battery 38, recording equipment 40, pinger 42, depth sensor 44 and switch 46. Battery 38 powers pump 32, winch 30, and recording equipment 40 via lines 48, 50 and 52, respectively. Also contained in battery 38 is a switching system communicating with switch 46 and 54 via lines 56 and 58, respectively. The switching system also communicates with the operator on the water's surface via line 60.

Depth sensor 44 communicates with recording equipment 40 via line 62. Pinger 42 communicates with recording equipment 40 via line 64. A sling 66 is utilized to position support member 20. Line 60 also is attached to sling 66.

To ensure proper operation of the telescoping sections 12, 14, 16 and 18, telescoping section 12 has stops 68 and 70 attached thereto. Telescoping section 14 has stops 72 and 74 attached thereto. Telescoping section 16 has stops 76 annd 78 attached thereto. Telescoping section 18 has stop 80 attached thereto. As an example, when probe 10 is extending downwardly, stop 72 encounters stop 70, thereby preventing further downward relative movement between telescoping sections 12 and 14. On the other hand, when probe 10 is being drawn upwards, stop 72 encounters stop 68, thereby preventing further upward relative movement between sections 12 and 14. The remaining stops on the remaining telescoping sections operate in the same manner.

Figure 2:
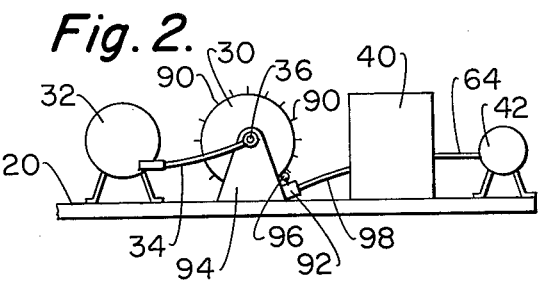
FIG. 2 illustrates some of the component parts of the specific embodiment of FIG. 1.

Now turning to FIG. 2, pump 32 is shown with water pipe 34 connected to water swivel joint 36. This allows pump 32 to force water through hose 28 and out nozzle 26.

In order to measure the depth that nozzle 26 penetrates into the sediment layer from its initial positions, a plurality of projections 90 are attached to winch 30. A limit switch 92 is attached to winch support 94 such that arm 96 strikes projections 90 as winch 30 revolves. Of course, the closer together projections 90 are, the more accurate the penetration measurements are.

Limit switch 92 communicates with recorder 40 via line 98. Also, a potentiometer may be utilized to measure the penetration depth. The potentiometer may be hooked up through gears to monitor the winch revolutions and interpret this signal in terms of penetration by proper calibration procedures.

Figure 3:
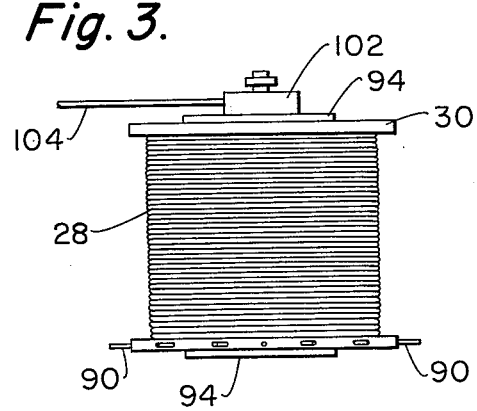
FIG. 3 illustrates the brake mechanism for the winch of FIG. 1.

FIG. 3 illustrates brake mechanism 102 attached to winch support 94. Brake mechanism 102 communicates with battery 38 of FIG. 1 via line 104.

The operation of the present invention is as follows. Support member 20 is lowered from a vessel or other float to the ocean bottom. Initially probe 10 is completely drawn up with telescoping sections 14, 16 and 18 inside telescoping section 12. In this position, nozzle 26 lies in a plane formed by foot 200, foot 202 and nozzle 26. This is the reference or initial position of probe 10. When support member 20 strikes the surface of the sediment layer, switch 46 is actuated, thereby causing battery 38 to energize pump 32, brake 102, and recorder 40. Pump 32 forces water through nozzle 26 and brake 102 releases winch 30 so that probe 10 can freely move downward under the force of gravity. It is noted that probe 10 has enough mass to freely extend downward such that the only significant impeding force is the sediment layer. As probe 10 moves downward, projections 90 on winch 30 strike limit switch 92, thereby recording the depth of penetration of probe 10 into the sediment layer from the initial or reference position. In addition, each time a projection 90 strikes limit switch 92, pinger 42 emits a sonar signal which is received by sonar receiving equipment aboard the floating vessel on the water's surface.

Upon being energized, recorder 40 records the depth of nozzle 26 in its initial position from depth sensor 44. Also, each time a projection 90 strikes arm 96, recorder 40 records the event, thereby recording the depth of penetration of nozzle 26.

Once probe 10 is fully extended or strikes rock, pinger 42 no longer emits sonar signals, thus an operator on the water's surface is informed that support member 20 is ready to be moved to a new location. The operator then signals to battery 38 via line 60. Battery 38 energizes winch 30, thereby causing probe 10 to be withdrawn from the sediment layer. When stop 72 of telescoping section 14 strikes stop 68, it closes switch 54. This causes battery 38 to energize brake 102, thereby securing probe 10 in its initial or reference position. Also, when battery 38 is signaled via line 60, pump 32 is turned off as well as recorder 40. However, until probe 10 is completely withdrawn such that nozzle 26 of probe 10 is in its initial position, pinger 42 continues to emit sonar signals such time projections 90 strikes arm 96. The pinger enables an observer located on the surface to ascertain when probe 10 has returned to its initial position and thereby when to signal battery 38 via line 60.

When the sonar signals terminate or when the number of sonar signals received before the signal on line 60 equals that number received while probe 10 was penetrating the sediment layer, the operator is informed that probe 10 is completely withdrawn from the sediment layer. The operator then moves support member 20 to a new location on the ocean bottom and the process starts anew.

Recorder 40 can be a chart recorder whereby a needle is displaced a specific distance from a reference point proportional to the depth of depth sensor 44. In addition, the needle is displaced a small amount each time limit switch 92 is closed by projections 90. Of course, when probe 10 is being withdrawn, recorder 40 is not recording.

It will be appreciated by those having ordinary skill in the art that necessary and sufficient water-proofing means are employed in the present invention.

Other alternative embodiments include supplying the present invention with power from the surface through an electromechanical cable. Also, locating the recording equipment on the surface or disposing switch 46 and depth sensor 44 on probe 10 and providing vertical orientation of probe 10 by utilizing a wire rope from a surface vessel.

Obviously many modifications and variations of the present invention are possible in light of the above teachings. It is therefore to be understood that within the scope of the appended claims the invention may be practiced otherwise than as specifically described herein.

I claim:

1. A subbottom rock mapping probe for measuring the thickness of a sediment layer located on the bottom of a body of water as well as the depth of the surface of the bottom sediment layer below the water surface comprising:
   a. support means;
   b. a telescoping probe comprising an elongate outer tube gimbally attached to said support means at a first end, an elongate inner tube having first and second opposite ends, a plurality of successively smaller diameter elongate tubes between said inner tube and said outer tube, said plurality of tubes being nested together in such manner that they will automatically extend downward in telescoping fashion when the force of gravity is applied thereto, said inner tube having the smallest diameter and being the last tube in said telescoping configuration, said telescoping probe being capable of automatically extending downward from an initial position along the vertical as a result of the force of gravity being exerted thereon;
   c. a nozzle connected to said elongate inner tube at said second end;
   d. means for forcing water through said elongate inner tube and said nozzle whereby the sediment impeding the automatic downward movement of said telescoping probe is dispersed; and
   e. means for controlling the movement of said telescoping probe.

2. The apparatus of claim 1 wherein said control means includes:
   a. means for initiating said automatic downward extension of said telescoping probe from said initial position; and
   b. means for returning said downwardly extended telescoping probe back to said initial position when said telescoping probe is fully extended or when said second end on said inner elongated tube encounters rock or other hard surface before said telescoping probe is fully extended.

3. The apparatus of claim 1 further comprising:
   a. recording means connected to said support means; and
   b. means communicating with said recording means for measuring the distance said nozzle extends vertically downward from the initial position of said telescoping probe.

4. The apparatus of claim 1 further including:

a depth sensor attached to said support means and communicating with said recording means, said depth sensor being at equal depth with said telescoping nozzle when said probe means is in said initial position.

5. The apparatus of claim 1 wherein said water forcing means includes:
   a. a pump mounted on said support means;
   b. power means mounted on said support means for supplying power to said pump; and
   c. a hose connected at one end to a hose coupling attachment disposed on said first end of said elongate inner tube and extending upwards through said tubes to communicate with said pump.

6. The apparatus of claim 5 wherein said returning means includes:
   a. a winch mounted on said support means upon which said hose winds;
   b. brake means for preventing said winch from turning;
   c. power means mounted on said support means for supplying power to said winch and said brake means, said winch winding said hose up when power is supplied thereto, said brake means allowing said winch to turn freely when power is supplied thereto;
   d. means connected to the inside of each of said plurality of successively smaller diameter tubes and said outer tube for preventing relative motion between any two adjacent tubes when the smaller diameter tube of the two adjacent tubes is completely drawn into the large diameter tube of the two tubes when said telescoping probe is being returned to its initial position, said means not impeding movement of said hose with respect to any of said plurality of tubes or said outer tube whereby when said winch winds said hose up, said telescoping probe is withdrawn to said initial position; and
   e. means located adjacent said outer tube for terminating movement of said winch and thereby said telescoping probe when said telescoping probe reaches said initial position when said telescoping probe is being returned to its initial position.

7. A method for measuring the thickness of a sediment layer located on the bottom of a body of water comprising the steps of:
   a. gimbally mounting a telescoping probe on a support member, said telescoping probe having a nozzle on the end of its smallest diameter section;
   b. securing said telescoping probe in an initial position, said initial position being a fully withdrawn position;
   c. lowering said probe and support member to the ocean bottom at the point the measurement is to be taken;
   d. releasing said telescoping probe from said initial position so that said telescoping probe can freely move downwardly under the force of gravity;
   e. forcing water through said telescoping probe's nozzle so that the sediment layer is dispersed in the vicinity of said nozzle, thereby removing the sediment layer as an impeding force to said probe's downward movement;
   f. measuring and recording the depth of penetration of said probe into the sediment layer when said probe is fully extended or when said probe encounters rock or other hard surface before said probe is fully extended;
   g. terminating the forcing of water through said telescoping probe and the measuring and recording of the depth of penetration of said probe;
   h. returning said probe from said sediment layer back to said probe's initial position;
   i. repeating steps labeled (b) through (h) above for each point to be measured on the ocean bottom.

8. The method of claim 7 further including, after the step of measuring and recording and before the step of terminating, the step of signaling to the surface of the water an indication of the termination of the probe's downward movement.

* * * * *